No. 769,771. PATENTED SEPT. 13, 1904.
E. W. SEAMANS.
BRICK MOLD.
APPLICATION FILED APR. 8, 1904.
NO MODEL. 2 SHEETS—SHEET 1.

Witnesses
Edward R. Monroe
Georgeana Chace

Inventor
Edward W. Seamans
By Luther V. Moulton
Attorney

No. 769,771.

Patented September 13, 1904.

UNITED STATES PATENT OFFICE.

EDWARD W. SEAMANS, OF GRAND RAPIDS, MICHIGAN.

BRICK-MOLD.

SPECIFICATION forming part of Letters Patent No. 769,771, dated September 13, 1904.

Application filed April 8, 1904. Serial No. 202,152. (No model.)

*To all whom it may concern:*

Be it known that I, EDWARD W. SEAMANS, a citizen of the United States, residing at Grand Rapids, in the county of Kent and State of Michigan, have invented certain new and useful Improvements in Brick-Molds; and I do hereby declare the following to be a full, clear, and exact description of the invention, such as will enable others skilled in the art to which it appertains to make and use the same.

My invention relates to improvements in brick-molds, and more especially to molds for manufacturing bricks of concrete or other like materials; and its object is to provide a device that is simple and convenient, that will discharge the molded bricks without breaking the same, that will produce either plain bricks or various forms of bricks for ornamental purposes, and to provide the device with various new and useful features, hereinafter more fully described, and particularly pointed out in the claims, reference being had to the accompanying drawings, in which—

Figure 1:
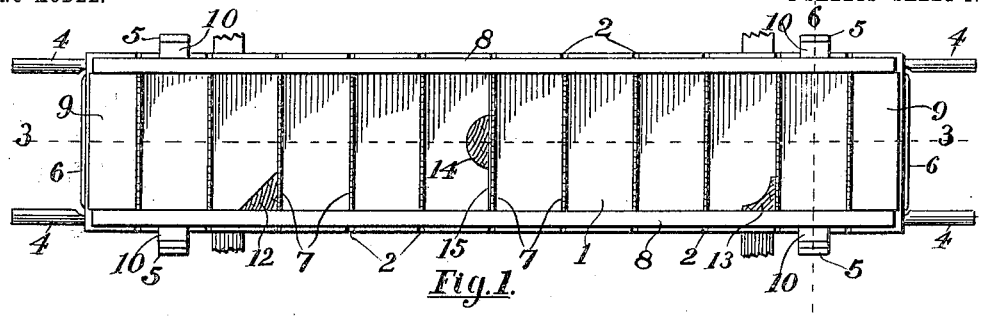
Figure 2:
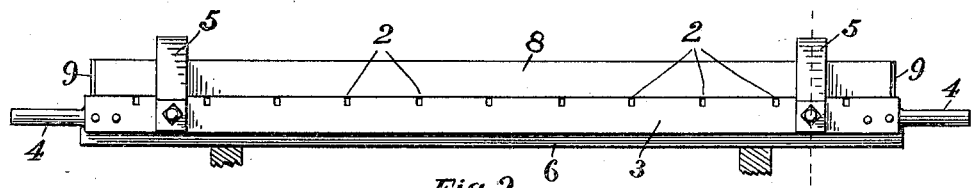
Figure 3:
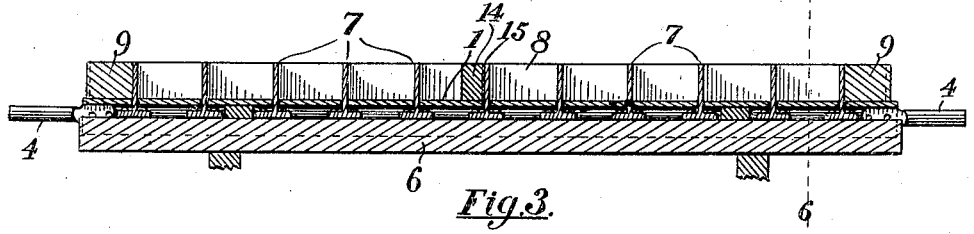
Figure 6:
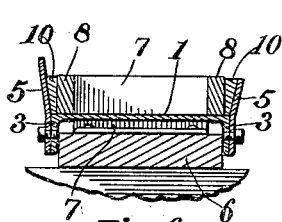
Figure 7:
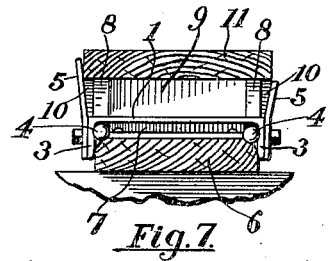
Figure 4:
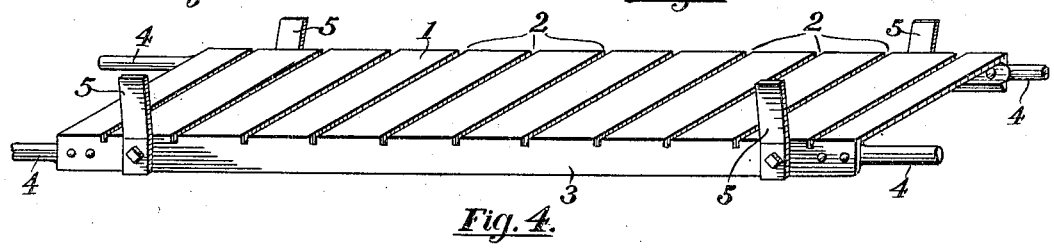
Figure 5:
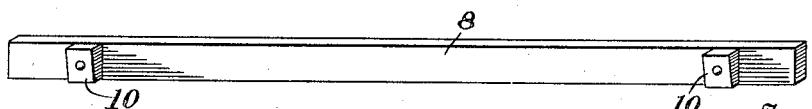
Figure 8:
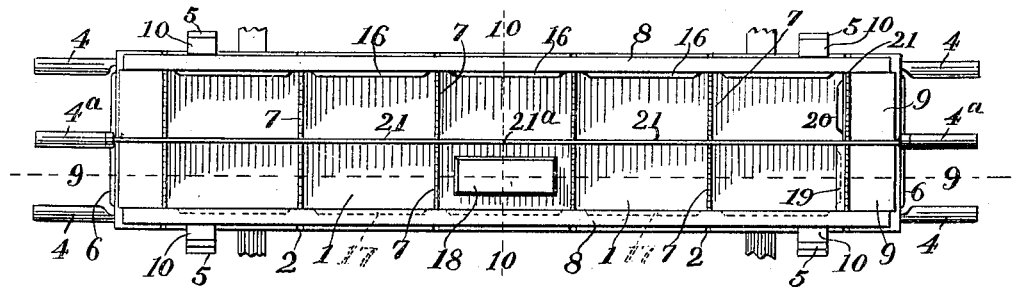
Figure 9:
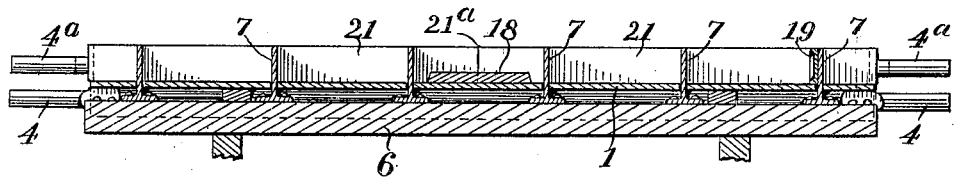
Figure 10:
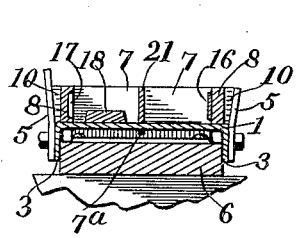
Figure 11:
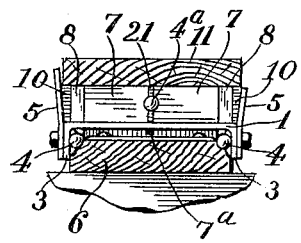
Figure 12:
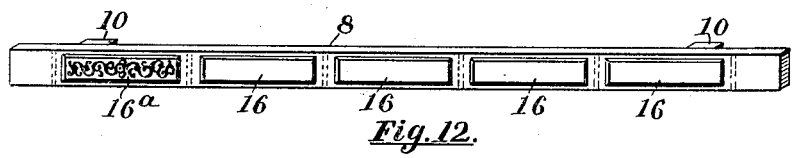
Figure 13:
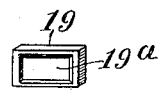
Figure 14:
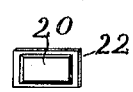

Figure 1 is a plan view of a device embodying my invention; Fig. 2, a side elevation of the same; Fig. 3, a longitudinal section of the same on the line 3 3 of Fig. 1; Fig. 4, a perspective detail of the bed-plate; Fig. 5, the same of one of the side bars; Fig. 6, a transverse section on the line 6 6 of Figs. 1, 2, and 3; Fig. 7, an end elevation of the mold with the follower-board placed thereon; Fig. 8, a modified construction in plan view for making paneled forms of bricks; Fig. 9, a longitudinal section of the same on the line 9 9 of Fig. 8; Fig. 10, a transverse section of the same on the line 10 10 of Fig. 8; Fig. 11, an end elevation of the same with a follower-board thereon; Fig. 12, a detail of one of the side bars of the same; Fig. 13, a detail of an inset for a raised end panel, and Fig. 14 the same for a depressed end panel.

Like numerals refer to like parts in all of the figures.

The bottom or bed of the mold is preferably made of a suitable bar of channel-iron by cutting transverse slots 2 therethrough and sufficiently deep to divide the middle portion of the bar into separate transverse strips corresponding in width to the bricks to be molded. The downwardly-extended flanges 3 of the channel-bar serve to connect these transverse portions and support the same. Attached to the respective ends of the flanges 3 are suitable handles 4 for manipulating the device. To each side of the bed are rigidly attached upwardly and outwardly extended inclined stops 5 to support the side bars 8 at a distance apart corresponding to the length of the bricks to be molded and to hold the same closely against the ends of the partitions 7. On these side bars opposite the stops 5 are wedge-blocks 10, having outer surfaces inclined to oppositely correspond to the inclination of the said stops. Partition-plates 7 are provided to extend upward through the slots 2 in the bed and separate the respective bricks from each other. Each partition-plate is flanged at the lower end and rigidly secured to a suitable sill 6, upon which sill the bed-plate 1 is supported, so that the top of the partitions and side bars are in the same plane when the mold is assembled for filling. At each end of the bed-plate are suitable blocks 9, which serve to prevent accumulation of the material upon the outer ends of the bed-plate.

To form molded corners to the bricks, suitable blocks of wood or other material are provided, as shown at 12, 13, and 14 of Fig. 1, block 12 being adapted to cut off the corner of the brick at an angle of forty-five degrees, block 13 forming a round and recessed corner, and block 14 forming a semicircular recess in the side of the brick. To locate this latter block properly, it is attached to a thin strip of sheet metal 15, having dimensions equal to that of the adjacent partition. This sheet metal is so thin that it makes no appreciable difference in the size of the bricks made in the mold. The mold can thus be used either with or without the block 14 to make bricks of substantially the same dimensions.

In operation the bed-plate is placed upon the sill 6, with the partitions 7 projecting through the slots 2. The side bars 8 are placed between the ends of the partitions and the stops 5, with the wedge-blocks 10 engaging the said stops, and in the event modified forms of bricks are made suitable blocks— such as 12, 13, or 14—are placed in the molds to displace so much of the material as occasion requires. The molds are then filled with the material to form bricks and the material rammed into the mold in any convenient manner and the surplus material struck off by a suitable straight-edge traversing the upper surface of the bars 8 and the partitions 7. A suitable follower-board 11 is then placed on top of the mold and in contact with the upper surface of the material, as shown in Fig. 7, and to prevent the same from sliding off the stops at one side extend upward far enough to engage said board, as shown. The bed-plate and everything supported upon the same is then lifted by means of the handles 4, thus stripping the partitions 7 downward through the slots 2 and away from between the bricks. The mold is then inverted, with the follower-board beneath the same, and the bed-plate 1 lifted off by means of the handles, the outward inclination of the stops 5 permitting the free removal of the same from contact with the wedge-blocks 10. The bars 8 are then freely removable from contact with the edge of the bricks, leaving them unbroken and resting upon the follower-board 11. The mold can then be reassembled upon the sill 6, as before, and the operation repeated indefinitely, each follower-board in turn being removed to any convenient place to permit the bricks thereon to harden. In the event that any of the blocks 12, 13, or 14 are used after the mold is removed they are also freely removable from contact with the bricks without danger of breaking the same.

In the modified construction shown in Figs. 8 to 14, inclusive, the device is adapted for forming paneled or otherwise ornamented edges or ends of the bricks, and for this purpose each alternate slot 2 of the bed-plate and the alternate partitions are omitted, and the mold is divided longitudinally by a longitudinal middle partition 21, which consists of a suitable strip of metal divided near the middle, as at $21^a$, and inserted in suitable alined vertical slots $7^a$ in the partitions and blocks 9 and rests on the bed-plate. This partition at its outer ends is provided with handles $4^a$, whereby it is withdrawn longitudinally in opposite directions. This arrangement enables me to withdraw the partition 21 after the follower-board has been placed thereon and the device rolled over upon the same. It also presents the side of each brick to the side bars 8, which are suitably provided with raised panels 16 or sunken panels 17 or any other configuration desired, such as a rough stone surface, and to panel the ends a panel-inset 19, having like sunken panels $19^a$ or a like inset 22, having a raised panel 20 or other surface to conform to the design of the side bars, is inserted in the end molds, as shown. To panel the bottom of the bricks, a like panel-inset is provided for the bottom mold and attached to the bed, one of the raised form being shown at 18. By this modified construction I am able to impart any convenient panel or other design to either the side, end, or bottom of the bricks. The operation of the modified construction differs only in the removal of the partition 21 by withdrawing the same longitudinally after the follower-board 11 has been placed on the device and the same rolled over with the follower-board beneath the same.

Having thus fully described my invention, what I claim, and desire to secure by Letters Patent, is—

1. The combination of a sill, partitions rigidly attached thereto, a bed-plate having slots to receive the partitions, detached side bars to engage the respective ends of the partitions, and stops attached to the bed-plate and extending vertically across the side bars whereby the said stops serve as the sole means of retaining the side bars in place.

2. The combination of a bed-plate consisting of a channel-iron having its middle portion divided by transverse slots, a sill to support the bed-plate, partitions rigidly attached to the sill and extending through the slots, detached side bars resting on the bed-plate and engaging the ends of the partitions, and stops rigidly attached to the flanges of the bed-plate and serving as the sole support for the side bars.

3. The combination of a bed-plate having transverse slots, a sill beneath the bed-plate, partitions attached to the sill and extending through the slots, detached side bars engaging the ends of the partitions and resting on the bed-plate, wedge-blocks on the side bars, and inclined stops engaging the wedge-blocks and attached to the bed-plate.

4. In a mold, the combination of a bed-plate, detached side bars resting on the bed-plate, wedge-blocks on the side bars, inclined stops on the bed-plate and engaging the wedge-blocks, and transverse blocks on the ends of the bed-plate and engaging the ends of the side bars.

5. In combination with a mold substantially as described and adapted to make plain rectangular bricks, a detached block placed in the mold to displace a part of the material, and a thin strip of sheet metal attached to said block to locate the same in the mold, whereby bricks of substantially the same dimensions as the aforesaid bricks may be made, with the blocks in the mold.

6. The combination of a bed-plate consisting of a channel-bar having a series of transverse slots dividing the middle portion thereof into separate sections, and downwardly-turned flanges connecting and supporting the said sections, handles attached to the flanges, a sill embraced by the flanges and supporting the bed-plate, partitions extending through the slots and attached to the sill, detached side bars engaging the ends of the partitions and resting on the bed-plate, wedge-blocks on the side bars, and inclined stops rigidly attached to the bed-plate, and engaging the wedge-blocks.

7. The combination of a bed-plate consisting of a channel-iron having its middle portion divided by transverse slots, a sill beneath the bed-plate, partitions rigidly attached to the sill and removably inserted in the slots, detached side bars engaging the ends of the partitions and resting on the bed-plate, and means for detachably holding the side bars in place.

8. The combination of a bed-plate having transverse slots, a sill, partitions attached to the sill and having alined vertical slots, a longitudinally-removable partition in the slots, side bars having paneled surfaces, means for detachably retaining the side bars in place, and a follower-board adapted to be placed on the top of the partitions to engage the bricks before the partitions are withdrawn.

9. The combination of a bed-plate having transverse slots, a sill, partitions attached to the sill and having alined vertical slots, a middle partition in said slots, and divided near the middle, handles on the ends of the partition to withdraw the same from the slots, side bars having paneled surfaces and engaging the ends of the partitions, wedge-blocks on the side bars, inclined stops on the bed-plate and engaging the wedge-bars, and a follower-board to receive the molded bricks.

10. The combination of a bed-plate having transverse slots spaced apart the length of the bricks, a sill, partitions attached to the sill and having alined vertical slots, a longitudinally-removable partition in the slots, side bars having paneled surfaces, and engaging the partition, detached paneled blocks adjacent the end partition, means for detachably securing the side bars in place, and a follower-board adapted to be placed on top of the partitions to engage the bricks before the partitions are withdrawn.

11. The combination of a bed-plate having transverse slots spaced apart the length of the bricks, a sill, partitions attached to the sill and having alined vertical slots, a divided and removable partition in the slots, paneled side bars engaging the ends of the partitions, wedge-blocks on the side bars, inclined stops on the bed-plate and engaging the wedge-blocks, a panel-block attached to the bed-plate and a detached panel-block adjacent to the end partition.

In testimony whereof I affix my signature in presence of two witnesses.

EDWARD W. SEAMANS.

Witnesses:
   LUTHER V. MOULTON,
   GEORGIANA CHACE.